May 3, 1932. R. H. ANDERSON 1,856,740
JIG SAW
Filed March 6, 1929 2 Sheets-Sheet 1
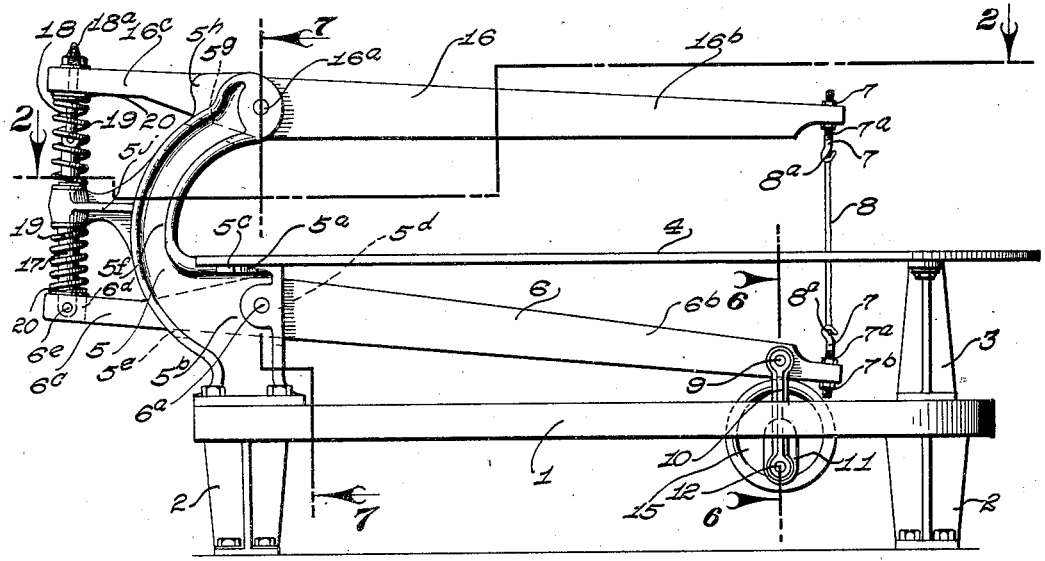
FIG. 1
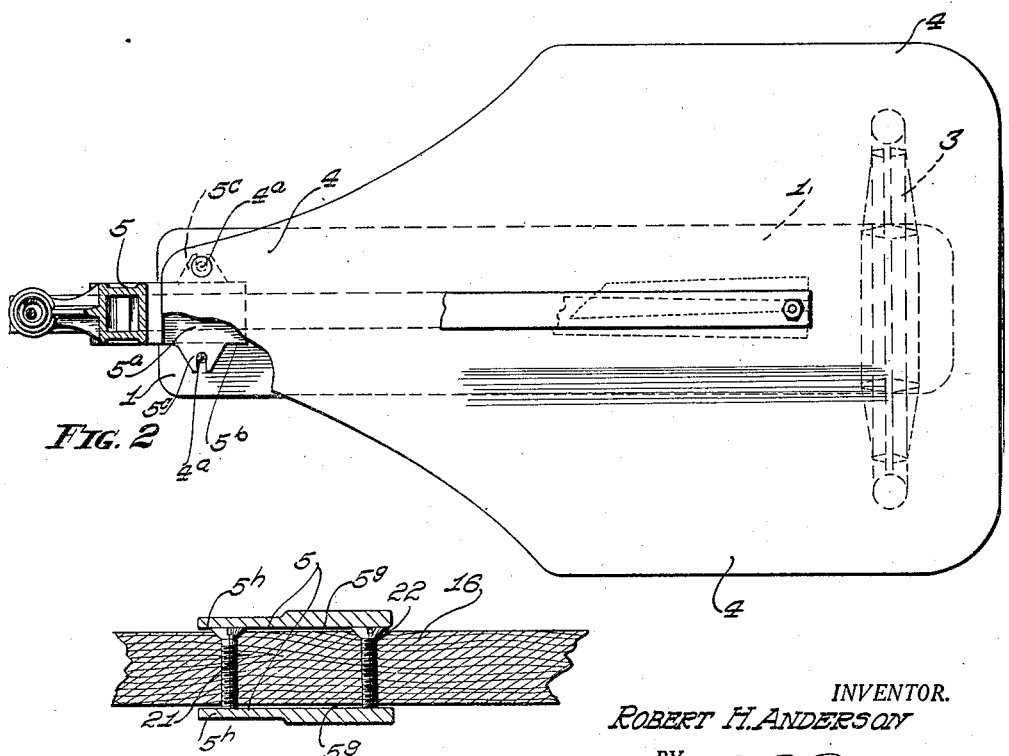
FIG. 2
FIG. 3
INVENTOR.
ROBERT H. ANDERSON
BY A. B. Bowman
ATTORNEY May 3, 1932.  R. H. ANDERSON  1,856,740
JIG SAW
Filed March 6, 1929  2 Sheets-Sheet 2

INVENTOR.
ROBERT H. ANDERSON
BY A. B. Bowman
ATTORNEY

Patented May 3, 1932

1,856,740

UNITED STATES PATENT OFFICE

ROBERT H. ANDERSON, OF SAN DIEGO, CALIFORNIA, ASSIGNOR OF ONE-HALF TO A. B. BOWMAN, OF SAN DIEGO, CALIFORNIA

JIG SAW

Application filed March 6, 1929. Serial No. 344,684.

My invention relates to jig saws and the objects of my invention are: first, to provide a jig saw in which the characteristic jagged edge of the work due to a pivotal movement about an axis intermediate the ends of the blade is eliminated; second, to provide a jig saw which may be operated at an extremely high speed without danger of breaking, thereby enabling use of the jig saw in connection with relatively hard substances not easily cut by slow movement of a saw; third, to provide a jig saw in which the shock normally occurring at the beginning and end of each stroke is absorbed or dampened; fourth, to provide a jig saw in which the blade although travelling at a high speed is subject to a minimum amount of strain other than the pressure of the work against it; fifth, to provide in connection with a jig saw a novel means for readily alining the one blade support arm with the other; sixth, to provide a novel hook and adjusting means for a jig saw blade which enables said blade to be adjusted so as to eliminate unnecessary and undesirable movement thereof; seventh, to provide a jig saw in which all movement of the blade, except the reciprocal movement desired, is reduced to a negligible amount; eighth, to provide a jig saw which may use the smallest of blades necessary for the most intricate jig saw work; ninth, to provide a jig saw in which the blades are easily interchangeable, and tenth, to provide a jig saw which is easily and economically manufactured, durable and sturdy of construction, compact, and which will not readily deteriorate or get out of order.

Figure 4:
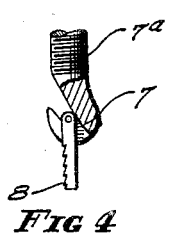
Figure 5:
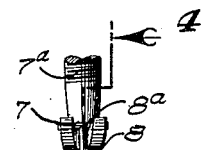
Figure 6:
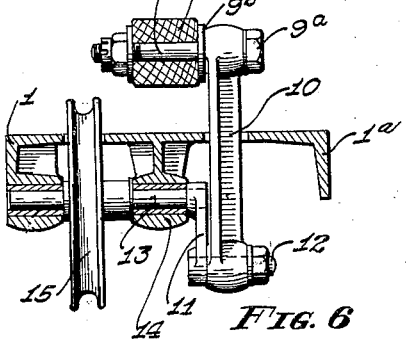
Figure 7:
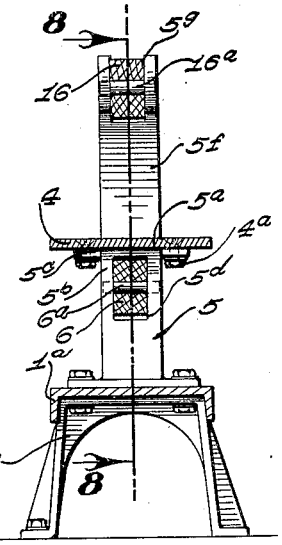
Figure 8:
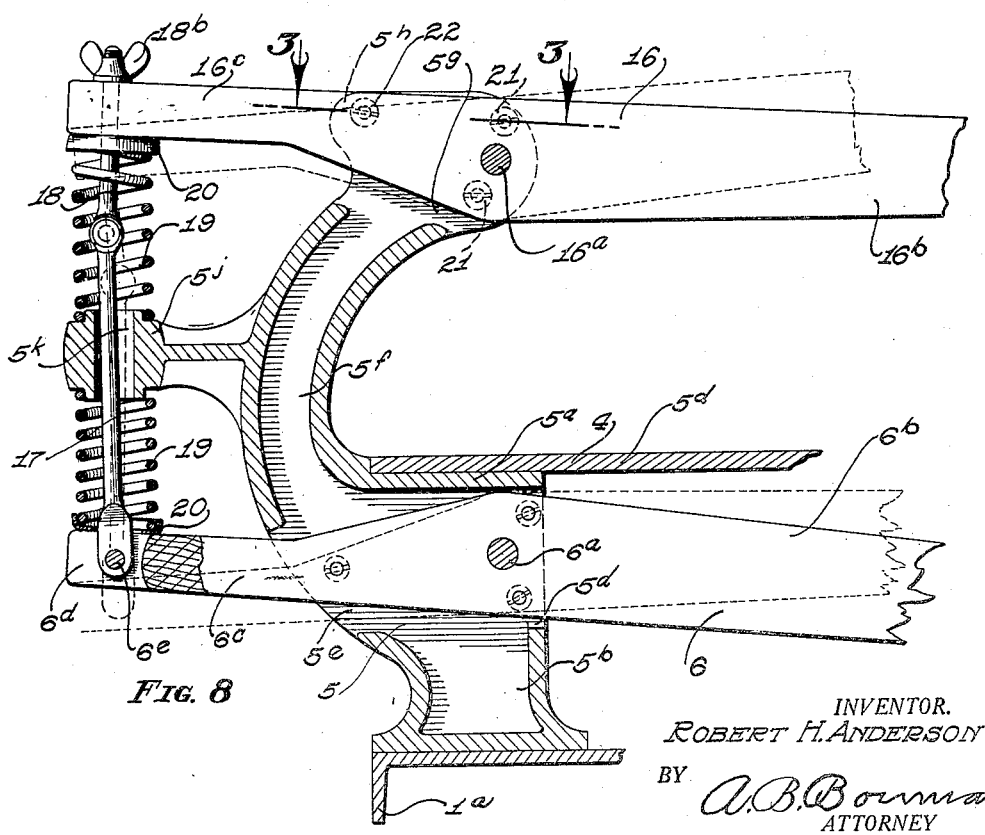

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon which form a part of this application, in which:

Figure 1 is a side elevational view of my jig saw; Fig. 2 is a sectional view thereof through 2—2 of Fig. 1; Fig. 3 is an enlarged fragmentary sectional view through 3—3 of Fig. 8; Fig. 4 is an enlarged fragmentary sectional view of the blade hook showing the saw blade fragmentarily, through 4—4 of Fig. 5; Fig. 5 is an enlarged fragmentary elevational view thereof; Fig. 6 is an enlarged sectional view through 6—6 of Fig. 1, with parts and portions in elevation to facilitate the illustration; Fig. 7 is a sectional view through 7—7 of Fig. 1, with parts and portions in elevation to facilitate the illustration, and Fig. 8 is an enlarged fragmentary sectional view through 8—8 of Fig. 7, with parts and portions in elevation to facilitate the illustration.

Similar characters of reference refer to similar parts and portions throughout the several views of the drawings.

Base member 1, foot members 2, work table support 3, work table 4, blade levers support 5, lower saw blade lever 6, saw blade hooks 7, saw blade 8, pin member 9, connecting rod 10, crank 11, crank pin 12, drive shaft 13, drive shaft bearings 14, power receiving means 15, upper saw blade lever 16, link members 17 and 18, springs 19, spring caps 20, bearing screws 21, and adjusting screws 22, constitute the principal parts and portions of my jig saw.

The base member 1 is relatively long, narrow and flat, as shown in Figs. 1 and 2. Its outer margins are provided with downwardly extending reinforcing ridges 1a, as shown best in Figs. 6 and 7. The base member 1 is supported near its forward and rear ends by transversely extending foot members 2. Positioned substantially above the forward foot member 2 is a work table support 3, which supports the forward portion of the work table 4.

The work table is relatively broad at its forward side and narrows towards its rear end, as shown best in Fig. 2. The rear end portion of the work table 4 is supported on a shelf 5a forming the upper surface of a pedestal portion 5b of a blade lever support 5.

Two lugs 5c, one extending out each side of the shelf 5a, are provided with slots therein adapted to receive screws 4a extending through the work table 4. The shelf 5a, being the same height as the work table support 3, holds the work table in parallel, spaced relation to the base 1. The bottom portion of the pedestal 5b is enlarged slightly so as to form a firm supporting surface and is secured to the base member 1, as shown best in Fig. 7.

The blade lever support 5 is preferably cast hollow from suitable metal, as shown in Figs. 1, 3 and 8. The pedestal portion 5b is provided with a slot 5d in its forward side and another slot 5e in its rear side, as shown best in Fig. 8. These slots communicate with the hollow interior of the support. The inner surfaces of the side portions of the support between these two slots 5d and 5e are flush with the side margins thereof and form side bearing surfaces for the lower saw blade lever 6.

This blade lever 6 is pivoted near its one end by means of a pin 6a which extends transversely through the pedestal portion a short distance inside the slot 5d. The longer arm 6b of the saw blade lever extends forwardly underneath the work table to a point near the forward end of the base member 1, as shown in Fig. 1. This arm gradually diminishes in size as it approaches its extended end. Near said extended end the arm 6b is provided with a hole extending substantially vertically and substantially at right angles to the longitudinal axis of the arm. Mounted in this hole is a shank 7a of a blade hook 7.

This shank 7a is threaded and adapted to receive nuts 7b which are tightened on either side of the hole through the extended end of the arm 6b and rigidly and adjustably hold the hook 7 in relation thereto. The hook 7 extends upwardly from the arm. The usual jig saw blade 8 is made of a thin, narrow steel band having a serrated or saw edge along one side and provided with small transversely extending pins 8a near its extended end. The hook 7 is bifurcated, as shown best in Figs. 4 and 5, so as to straddle the saw blade and engage the pins 8a thereon.

Near the extended end of the arm 6b is a horizontally, transversely extending pin 9 which may be merely a bolt. Between the head 9a of the pin and a washer 9b adjacent to the side surface of the arm 6b is pivotally mounted the one end of a connecting arm 10, the other end of which is pivotally secured to a crank pin 12.

The crank pin 12 extends horizontally in parallel relation to the pin 9 and is secured at its one end to a crank member 11. The crank member in turn is secured to a drive shaft 13 supported in bearings 14. These bearings depend from the base member 1 and are made integral therewith, as shown in Fig. 6. Mounted between these bearings is a pulley wheel or other suitable power receiving means 15. A suitable motor, not shown, is used to drive this wheel 15, which by means of the crank 11 and connecting rod 10 causes a pivotal movement of the lever 6.

The other or shorter arm 6c of the blade lever 6 extends out through the slot 5e in the blade levers support 5 and protrudes a slight distance past said support 5.

Extending rearwardly and upwardly, then curving forwardly above the pedestal 1 is a bracket portion 5f of the support 5. A slot 5g is provided in the upper portion of this bracket 5f leaving only the side walls of the upper portion of the bracket 5f, as shown best in Figs. 3, 7 and 8. Each wall of this slotted upper portion 5g is provided with a rearwardly extending ear portion 5h, as shown best in Figs. 1, 3 and 8. The side walls of the slot 5g together with the ear portion 5h form bearing surfaces for the sides of the upper saw blade lever 16.

The upper saw blade lever 16 is pivoted near its rear end on a transversely extending pin 16a which is in vertical alinement with the pin 6a. The forward or longer arm 16b of the lever 16 is in vertical alinement with the arm 6b of the lower saw blade supporting lever 6. The extended end of this arm 16b is in vertical alinement over the extended end of the arm 6b. A vertically extending hole is provided in this extended end of the arm 16b through which extends the shank 7a of another blade hook 7, identical in construction to the first described blade hook. The saw blade 8 is supported by its pins 8a between these two blade hooks. The saw blade extends upwardly through a slot provided in the work table.

The other or shorter arm 16c of the upper blade lever 16 extends rearwardly in vertical alinement with the lower blade lever 16, its end terminating substantially flush with the end of the lower arm 6c.

The extended end of the shorter arm 6c of the lower blade lever 6 is provided with a vertically formed slot 6d through which extends a horizontal pin 6e. Pivotally mounted by its lower end on this pin 6e within the slot 6d is a link member 17.

The link member 17 reaches to a point near the corresponding arm 16c of the upper blade lever 16. A second link member 18 is pivotally secured at its lower end to the link member 17. The link member 18 extends upwardly through a vertically positioned hole projecting through the arm 16c. The upper portion of the link member 18 is threaded at 18a to receive a wing nut 18b. Tightening down upon the wing nut 18b brings the arms 6c and 16c closer together and moves the arms 6b and 16b further apart; thus firmly holding the saw blade 8 between its hook members 7.

Extending rearwardly from the bracket 5f is an arm portion constituting a spring rest 5j which is provided with a vertically extending hole 5k therein. This spring rest is preferably integral with the bracket 5f. The upper and lower surfaces of the rest 5j are adapted to support the one end of each of two springs 19. The upper spring 19 extends between the spring rest and the lower surface of the upper arm 16c. A spring cup 20 is positioned between the spring 19 and the arm 16c so as to reduce wear thereon. Similarly, the lower spring 19 extends between the lower surface of the rest 5j and the upper surface of the lower arm 6c. A spring cup 20 is positioned between this spring 19 and the lower arm 6c so as to reduce wear thereupon.

The link member 17 extends through the hole or opening 5k provided in the spring rest. The hole 5k is large enough to permit oscillation of the spring member caused by a pivotal movement of the blade arms. The lower blade lever 6 by means of the link members 17 and 18 and springs 19 operate the upper lever 16.

As indicated in Fig. 1, the length of the arms 6b and 16b are relatively long as compared to the extent of movement of their extended ends. Thus the forward and back movement of the saw blade due to the pivotal movement of the arms 6 and 16, is practically negligible.

It will be noted that the axes of the pins 8a of the saw blade are parallel to the axes of rotation of the levers 6 and 6c about the pins 6a and 16a. It will be further noted that the distance between the pins 6a and 16a is approximately equal to the distances between the pins 8a so that these four axial points are corners of a parallelogram. Still further, the longer sides of the parallelogram so formed are considerably longer than the shorter or vertical sides thereof. (In the structure indicated, the longer side is approximately three and one-half times the shorter side.) This elongation of the parallelogram enables the use of saw blades of a slightly varied length without causing an appreciable rocking movement of the saw blade about axes intermediate their ends. The objectionable rocking movement of the saw blade, due to the parallelogram being distorted, increases with the extent of movement of the arms 6 and 16 in either direction from the position assumed when the parallelogram approaches a rectangle. Thus, by restricting the movement of the saw blades to the shortest possible scope, the objectionable rocking movement of the saw blades is minimized. It can be seen, in the structure shown; that the points of actual movement between the saw blades and levers, and between the levers and support, closely approach the corners of the parallelogram in location; that the parallelogram so formed is the elongated one; that movement of the levers is so arranged whereby, at the middle of the stroke, the parallelogram associated therewith approaches a rectangle in form; and, that the extent of movement of the levers is at a minimum.

Thus there is provided a jig saw which is particularly accurate and does not tear the wood or form a jagged cut.

The levers 6 and 16 are preferably made of wood and the support 5 therefor is made of metal. In order to prevent the levers from working loose and wobbling due to wear between the wood and metal, bearing screws 21 and adjusting screws 22 are provided.

The bearing screws 21 are plain screws which extend transversely through the blade arms, as shown best in Fig. 3. These screws are equal in length to the distance between the side bearing surfaces of the arms 6 or 16. The head of each screw rests against the one side bearing surface, while the extended end thereof rests against the other or opposite side bearing surface. This is shown in Fig. 3, where the space between the side bearing surfaces and the blade lever is exaggerated in order to facilitate the illustration. As shown best in Fig. 8, several of these bearing screws may be positioned around the pin 6a or 16a of the levers 6 or 16.

The adjusting screw 22 is also a bearing screw but is positioned as far as possible from the pivotal point of its lever and yet in a position so as to be in contact with the bearing surfaces at all times.

By turning the adjusting screw one direction or the other it is possible to shift the extended end of the blade lever sidewise, as indicated by dotted lines in Fig. 2.

As the lower blade lever 6 is held at its extended end by the connecting rod and driving mechanism, it is comparatively simple to adjust and the adjusting screw plays no very important part; but in the upper blade lever the adjusting screw permits the adjustment thereof until said upper blade lever is in exact vertical alinement with the lower blade lever.

The springs 19 tend to check the momentum at the opposite ends of the stroke and thus absorb or dampen shocks, providing a smooth running device without vibration.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In a jig saw, a pair of spaced apart saw blade levers, a common support therefor for supporting the pivotal points of said levers in vertical relation, said support having an arm portion extending intermediate said levers a saw blade connected between corresponding extended ends of said levers, and dampening means extending between said saw blade levers and said arm portion for dampening the shock upon said saw blade levers.

2. In a jig saw, a support provided with vertically spaced pivot supports and with a backwardly extending lug, a pair of saw blade levers pivoted intermediate their ends on said pivot supports, a saw blade supported between the said levers at one end of the pair and a connecting rod pivoted intermediate its ends and pivotally connected to the opposite ends of said levers and passing through said lug, and springs interposed between the ends of said levers and said lug.

In testimony whereof, I have hereunto set my hand at San Diego, California, this 12th day of February 1929.

ROBERT H. ANDERSON.